United States Patent
Vermeersch et al.

(10) Patent No.: US 10,266,052 B2
(45) Date of Patent: Apr. 23, 2019

(54) STEERING COLUMN ASSEMBLY HAVING A SHIFT GATE ASSEMBLY

(71) Applicant: Steering Solutions IP Holding Corporation, Saginaw, MI (US)

(72) Inventors: Michael C. Vermeersch, Essexville, MI (US); Arthur W. Nellett, Davison, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 99 days.

(21) Appl. No.: 15/299,946

(22) Filed: Oct. 21, 2016

(65) Prior Publication Data

US 2018/0111478 A1    Apr. 26, 2018

(51) Int. Cl.
| | |
|---|---|
| *G05G 1/00* | (2006.01) |
| *B60K 20/06* | (2006.01) |
| *F16H 59/02* | (2006.01) |
| *F16H 61/24* | (2006.01) |

(52) U.S. Cl.
CPC .............. *B60K 20/06* (2013.01); *F16H 61/24* (2013.01); *G05G 1/00* (2013.01); *B60Y 2400/411* (2013.01); *F16H 2059/026* (2013.01); *F16H 2061/242* (2013.01); *F16H 2061/247* (2013.01)

(58) Field of Classification Search
CPC ... B60K 20/06; F16H 59/10; F16H 2059/026; F16H 61/24; F16H 2061/242; F16H 2061/247; B62D 1/16; G05G 1/00; B60Y 2400/411
See application file for complete search history.

(56) References Cited

U.S. PATENT DOCUMENTS

| | | | | |
|---|---|---|---|---|
| 4,537,088 A | * | 8/1985 | Kubota ................. | B60K 20/06 74/473.21 |
| 4,762,015 A | * | 8/1988 | Katayama .............. | B62D 1/184 280/775 |
| 4,821,605 A | * | 4/1989 | Dzioba ............. | B60R 25/02144 192/219.4 |
| 4,936,431 A | * | 6/1990 | Shinpo ................... | F16H 59/10 137/74 |
| 4,981,048 A | * | 1/1991 | Kobayashi ............ | B60K 20/06 180/336 |
| 5,050,411 A | * | 9/1991 | Kawachi ........... | B60R 25/02144 70/201 |
| 5,280,732 A | * | 1/1994 | Katsumata ............ | B60K 20/06 74/473.32 |
| 5,542,512 A | * | 8/1996 | Maehara ................. | F16H 59/10 192/220.2 |

(Continued)

FOREIGN PATENT DOCUMENTS

| | | | | |
|---|---|---|---|---|
| JP | | 01114538 A | * | 5/1989 |
| JP | | 01186432 A | * | 7/1989 |

(Continued)

*Primary Examiner* — Laura Freedman
(74) *Attorney, Agent, or Firm* — Cantor Colburn LLP

(57) ABSTRACT

A shift gate assembly includes a detent plate having a shift gate pattern. The shift gate pattern is provided with a first detent, a second detent, and a plurality of intermediate sides that extend between the first detent and the second detent. A side of the first detent that faces towards another side of the second detent is disposed in a non-parallel relationship with another side of the second detent.

17 Claims, 2 Drawing Sheets

(56) References Cited

U.S. PATENT DOCUMENTS 5,647,465 A * 7/1997 Burkhard ................ F16H 59/10
                                                    192/220.2
9,447,866 B2 * 9/2016 Vermeersch ............ F16H 61/24

FOREIGN PATENT DOCUMENTS

| JP | 07215085 A | * | 8/1995 |
| JP | 09099752 A | * | 4/1997 |
| JP | 10086693 A | * | 4/1998 |
| JP | 2001080383 A | * | 3/2001 |

* cited by examiner

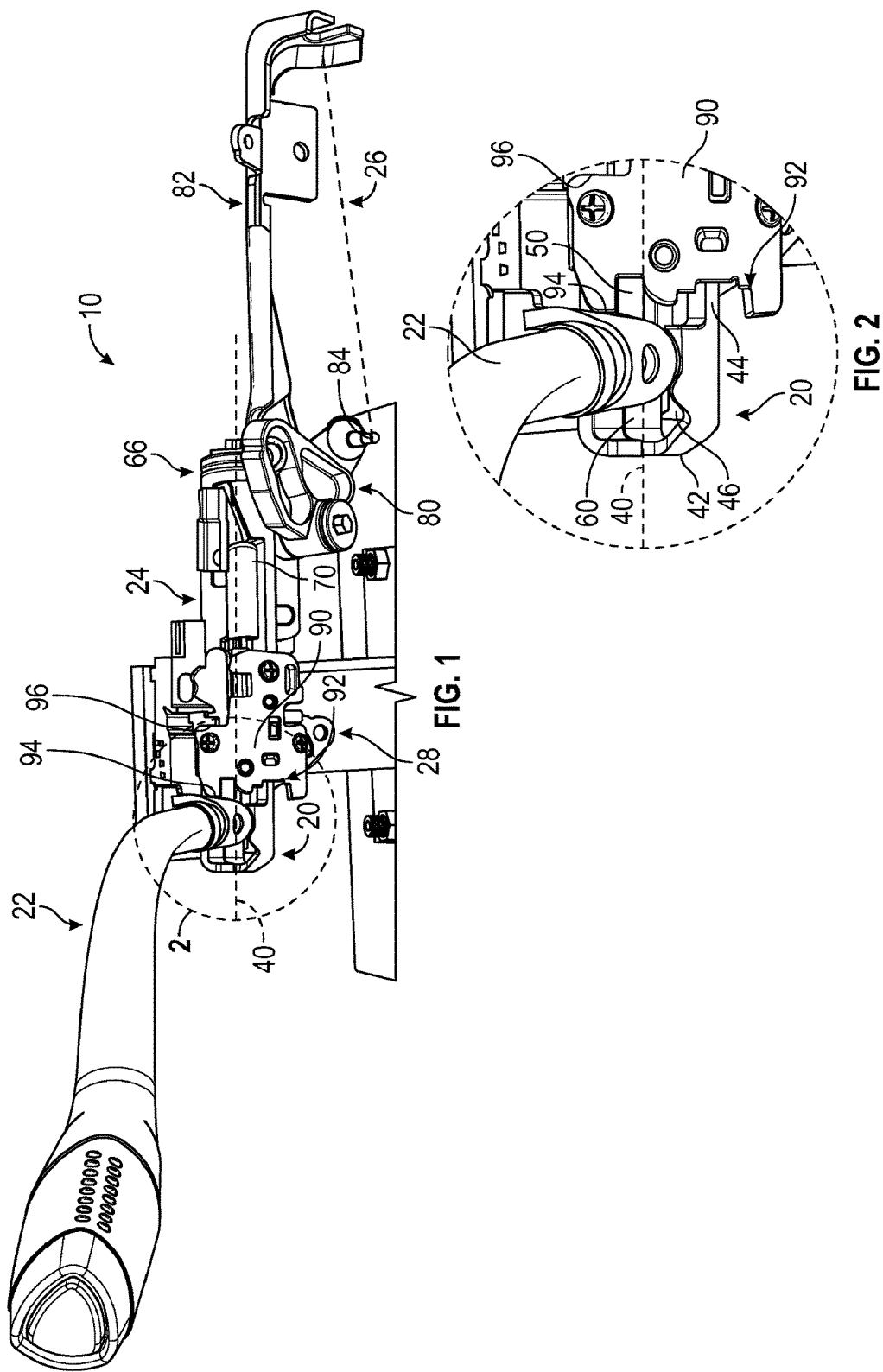

STEERING COLUMN ASSEMBLY HAVING A SHIFT GATE ASSEMBLY

BACKGROUND OF THE INVENTION

Vehicles are provided with a shift system that is operable to select or shift gears of a vehicle transmission. The shift system may be mounted to a vehicle steering column and is operatively connected to the vehicle transmission through a cable linkage. The shift system may be sensitive to over travel and cable lash that may impact the gear selection or gear shifting of the vehicle transmission.

SUMMARY OF THE INVENTION

According to an embodiment of the present disclosure, a steering column assembly is provided. The steering column assembly includes a shaft, a shift lever, a shift bracket, and a shift gate assembly. The shaft extends along a first axis and is rotatable about the first axis between a plurality of positions. The shift lever is pivotally connected to the shaft and is movable between a first position that inhibits rotation of the shaft about the first axis and a second position that facilitates rotation of the shaft about the first axis. The shift bracket extends between the shaft and an actuator mechanism. The shift gate assembly is disposed on the shift bracket and includes a detent plate. The detent plate has a shift gate pattern that is provided with a first detent, a second detent, and a plurality of intermediate sides extending between the first detent and the second detent. A side of the first detent that faces towards another side of the second detent is disposed in a non-parallel relationship with another side of the second detent.

According to another embodiment of the present disclosure, a steering column assembly is provided. The steering column assembly includes a shift gate assembly that is disposed on a shift bracket that is disposed on a steering column. The shift gate assembly includes a detent plate. The detent plate has a first side spaced apart from a second side, a third side extending between the first side and the second side, a fourth side spaced apart from the second side, a fifth side extending between the second side and the fourth side. The detent plate also has a sixth side disposed opposite the first side, a seventh side spaced apart from the sixth side, an eighth side extending between the sixth side and the seventh side, and a ninth side extending from the seventh side towards the fourth side, the seventh side becoming progressively closer to the sixth side in a direction that extends towards the eighth side.

According to yet another embodiment of the present disclosure, a shift gate assembly for a steering column assembly is provided. The shift gate assembly includes a detent plate having a shift gate. The shift gate is defined by a first side, a second side spaced apart from the first side, a third side extending between the first side and the second side, a fourth side spaced apart from the second side, a fifth side extending between the second side and the fourth side, and a sixth side disposed opposite the first side, a seventh side spaced apart from the sixth side, an eighth side extending between the sixth side and the seventh side, the seventh side being disposed parallel to but not coplanar with the sixth side.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a steering column assembly;

FIG. 2 a partial perspective view of a shift gate assembly of the steering column assembly.

DETAILED DESCRIPTION

Figure 3:
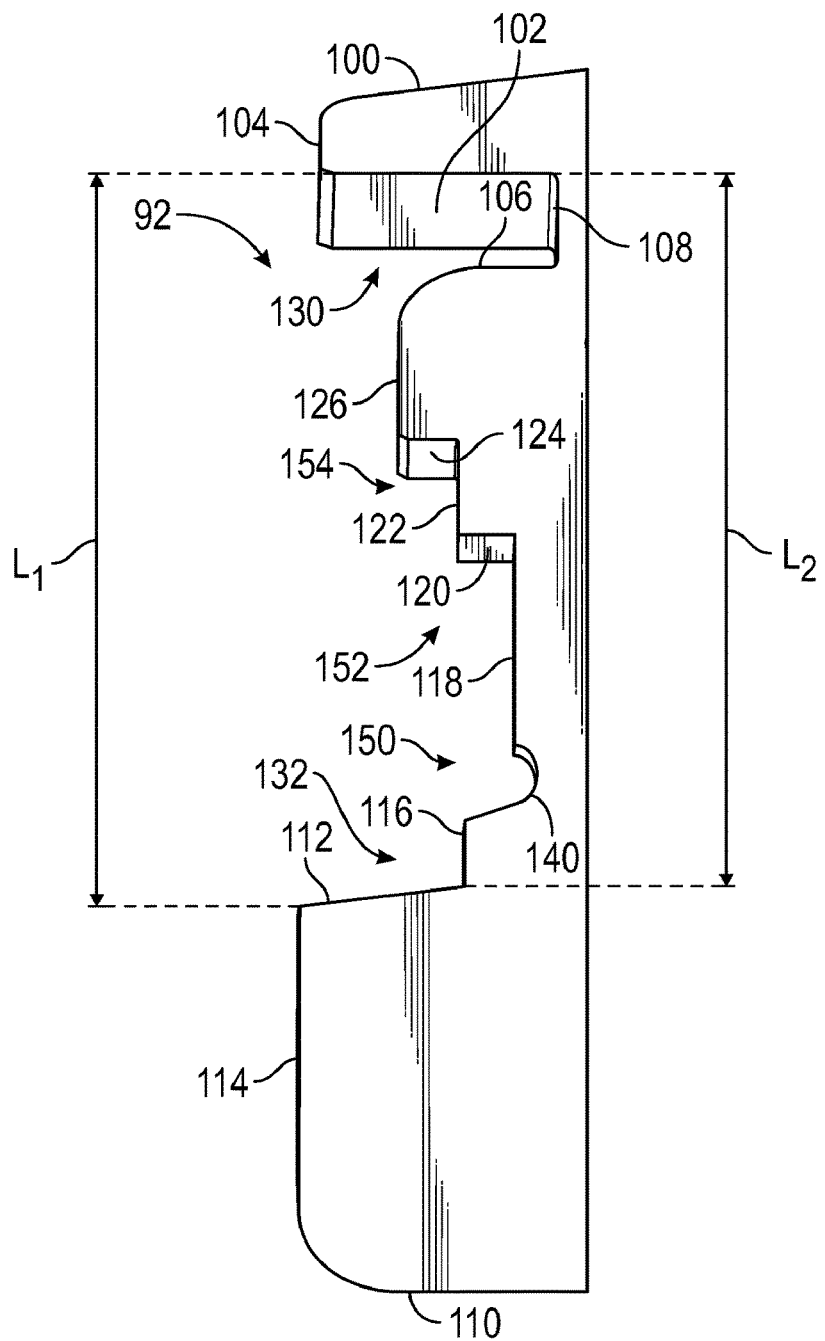
FIG. 3 is a perspective view of a detent plate of the shift gate assembly.

Referring now to the Figures, where the invention will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 1 and 2, a steering column assembly 10 is illustrated. The steering column assembly 10 is provided with a vehicle having an automatic transmission. The steering column assembly 10 includes a shaft 20, a shift lever 22, a shift bracket 24, a cable assembly 26, and a shift gate assembly 28.

The shaft 20 is configured as an elongate member that extends along a first axis 40. The shaft 20 has a first shaft end 42 and a second shaft end 44 that is disposed opposite the first shaft end 42. The shaft 20 defines an opening 46 that is disposed proximate the first shaft end 42.

The shift lever 22 is operatively connected to the shaft 20. The shift lever 22 is at least partially received within the opening 46 that is disposed proximate the first shaft end 42. The combination of the shaft 20 and the shift lever 22 are rotatable about the first axis 40 between a plurality of positions. The plurality of positions may correspond to a park position P, a reverse position R, a neutral position N, a drive position D, and another drive position M. The park position P may correspond to a first radial or rotational position of the shaft 20 and the shift lever 22. Another drive position M may correspond to a last radial or rotational position of the shaft 20 and the shift lever 22.

The park position P of the shaft 20 and the shift lever 22 corresponds to a park position of the automatic transmission. The reverse position R of the shaft 20 and the shift lever 22 corresponds to the reverse position of the automatic transmission. The neutral position N of the shaft 20 and the shift lever 22 corresponds to the neutral position of the automatic transmission. The drive position D of the shaft 20 and the shift lever 22 corresponds to the drive position of the automatic transmission. Another drive position M of the shaft 20 and the shift lever 22 corresponds to another drive position of the automatic transmission such as a low gear or the like.

The shift lever 22 is movable between a first position and a second position. A portion 50 of the shift lever 22 is at least partially received within a portion of the shift gate assembly 28 while the shift lever 22 is in the first position to inhibit rotation of the shaft 20 and the shift lever 22 about the first axis 40. A portion 50 of the shift lever 22 is not received within a portion of the shift gate assembly 28 while the shift lever 22 is in the second position to permit rotation of the shaft 20 and the shift lever 22 about the first axis 40 to move the shaft 20 and the shift lever 22 between the plurality of positions. A portion 50 of the shift lever 22 is configured as a finger, protrusion, nub, or the like.

Accordingly, in order to move the shaft 20 and the shift lever 22 between the plurality of positions, the shift lever 22 is pivoted from the first position towards the second position. A biasing member 60 is provided and is configured to bias the shift lever 22 towards the first position. The biasing member 60 is received within the opening 46 of the shaft 20. The biasing member 60 is disposed between an end of the opening 46 of the shaft 20 and a portion of the shift lever 22.

The shift bracket 24 is operatively connected to the shaft 20. The shift bracket 24 extends between the second shaft end 44 and an actuator mechanism 66. In at least one embodiment, an electronic park lock 70 is provided. The electronic park lock 70 is disposed on the shift bracket 24 and is disposed between the actuator mechanism 66 and the shift gate assembly 28. The electronic park lock 70 is configured to retain or hold the shift lever 22 and the shaft 20 and the park position P. The electronic park lock 70 may be configured as a solenoid having a pin that is movable between an inhibit position and a permitting position. The inhibit position of the pin corresponds to an extended position of the pin that inhibits movement of the shift lever 22 from the park position P by retaining at least a portion of the shift lever 22 from the first position. The permitting position of the pin corresponds to a retracted position of the pin that permits movement of the shift lever 22 from the park position P by permitting at least a portion of the shift lever 22 to be moved from the first position towards the second position.

The actuator mechanism 66 is configured to actuate, change, or shift a position of the automatic transmission based on the rotational position of the shaft 20 and the shift lever 22. The actuator mechanism 66 includes a shift cam 80 and a cable bracket 82.

The shift cam 80 is pivotally connected to an end of the shift bracket 24. The shift cam 80 defines a cable attachment 84 that extends from the shift cam 80. The cable bracket 82 extends from the shift cam 80 away from the shift bracket 24. The cable assembly 26 is operatively connected to the shift cam 80 and a portion of the cable bracket 82. The movement of actuator mechanism 66 moves the shift cam 80 in response to movement of the shaft 20 and the shift lever 22 actuates the cable assembly 26 to shift, to change, or to actuate a position of the automatic transmission.

The automatic transmission may be sensitive to over travel and/or lash of the cable linkage of the cable assembly 26. The shift gate assembly 28 includes a detent plate 90 having a shift gate pattern 92 that is configured to provide sufficient actuation of the cable linkage of the cable assembly 26 to ensure a complete shift into at least one of the plurality of positions of the shaft 20, the shift lever 22, and the automatic transmission without increasing the designed over travel of the shift gate pattern 92 of the detent plate 90. The shift gate assembly 28 is configured provide a self-aligning shift position of the shift lever 22.

The shift gate pattern 92 of the detent plate 90 facilitates additional rotational travel of the shaft 20 and the shift lever and a selected position of the plurality of positions and also reduces the shift lever 22 position when the shift lever 22 is in the first position or in an "at rest" position. The "at rest" position is created when a customer releases the shift lever 22 and the biasing member 60 biases the shift lever 22 from the second position towards the first position in which the a portion 50 of the shift lever 22 is received within a portion of the shift gate pattern 92 of the detent plate 90 of the shift gate assembly 28. The shift gate pattern 92 of the detent plate 90 of the shift gate assembly 28 is configured to prevent the shift lever 22 from rotating away from the selected position if the customer leans on or rests a portion of their arm/hand on the shift lever 22 while the shift lever 22 is in the "at rest" position.

The detent plate 90 of the shift gate assembly 28 is disposed on the shift bracket 24. The detent plate 90 includes a first end 94 that faces towards the shift lever 22 and a second end 96 disposed opposite the first end 94 that faces away from the shift lever 22. The shift gate pattern 92 is defined by the detent plate 90 proximate the first end 94 the detent plate 90. The shift gate pattern 92 is defined by a plurality of detents that correspond to the plurality of positions.

Referring to FIG. 3, an illustrative embodiment of the shift gate pattern 92 of the detent plate 90 of the shift gate assembly 28 is shown. The shift gate pattern 92 includes a plurality of detents defined by a plurality of surfaces and/or sides and includes a plurality of intermediate sides or surfaces extending between the detents. A side of one of the detents that faces towards another side of another detent is disposed in a non-parallel, non-perpendicular relationship with the another side of the another detent The shift gate pattern 92 includes a first side 100, a second side 102, a third side 104, a fourth side 106, a fifth side 108, a sixth side 110, a seventh side 112, an eighth side 114, a ninth side 116, a tenth side 118, an eleventh side 120, a twelfth side 122, a thirteenth side 124, and a fourteenth side 126.

The first side 100 is disposed substantially parallel to the first axis 40. In at least one embodiment the first side 100 is disposed at an angle relative to the first axis 40 such that the first side 100 is disposed in a nonparallel and a non-perpendicular relationship with the first axis 40.

The second side 102 is spaced apart from the first side 100. A distal end of the first side 100 is disposed closer to the second side 102 than a proximal end of the first side 100.

The third side 104 extends between the distal end of the first side 100 and a distal end of the second side 102. The third side and 104 is disposed substantially transverse to the first axis 40.

The fourth side 106 is spaced apart from the second side 102. The fourth side 106 is disposed substantially parallel to the second side 102.

The fifth side 108 extends between a proximal end of the second side 102 and a proximal end of the fourth side 106. The second side 102, the fourth side 106, and the fifth side 108 define a first detent 130. The first detent 130 may correspond to the park position P.

The sixth side 110 is disposed opposite the first side 100. The sixth side 110 is disposed substantially parallel to the first axis 40. The sixth side 110 is disposed further from the first axis 40 than the first side 100.

The seventh side 112 is spaced apart from the sixth side 110. The seventh side 112 is disposed closer to the first axis 40 than the sixth side 110. The seventh side 112 faces towards and is disposed in a nonparallel relationship with the second side 102. The seventh side 112 is chamfered at an angle that may be varied or variable to meet travel requirements. A distal end of the seventh side 112 is disposed closer to the sixth side 110 than a proximal end of the seventh side 112 such that the seventh side 112 becomes progressively closer to the sixth side 110 in a direction that extends towards the eighth side 114.

A first length, L1, is defined between the distal end of the second side 102 and the distal end of the seventh side 112.

A second length, L2, is defined between the proximal end of the second side 102 and the proximal end of the seventh side 112. The first length, L1, is greater than the second length, L2.

The eighth side 114 extends between the distal end of the sixth side 110 and a distal end of the seventh side 112. The eighth side 114 is disposed substantially parallel to but not coplanar with the third side 104.

The ninth side 116 extends from proximal end of the seventh side 112 towards the fourth side 106. The ninth side 116 is disposed substantially parallel to the eighth side 114. The ninth side 116 is disposed closer to the eighth side 114 than the fifth side 108. A length of the ninth side 116 may be varied to facilitate increased or decreased travel of the shift lever 22. The fifth side 108, the eighth side 114, and the ninth side 116 are disposed substantially parallel to each other but not coplanar with each other.

The ninth side 116 and the seventh side 112 at least partially define a second detent 132. The second detent 132 may correspond to another drive position, M.

The tenth side 118 is disposed substantially parallel to and is disposed substantially proximate to the ninth side 116. An interrupt surface 140 is disposed between the tenth side 118 and the ninth side 116. The interrupt surface 140 is configured as a notch, a groove, an arcuate surface, or the like that extends between the ninth side 116 towards the tenth side 118. The ninth side 116, the tenth side 118, and the interrupt surface 140 define a third detent 150. The third detent 150 may correspond to the drive position D.

The eleventh side 120 extends from a distal end of the tenth side 118. The eleventh side 120 is disposed substantially parallel to the sixth side 110. The eleventh side 120 and the tenth side 118 define a fourth detent 152. The fourth detent 152 may correspond to the neutral position N.

The twelfth side 122 extends from a distal end of the eleventh side 120 towards the thirteenth side 124. The twelfth side 122 is disposed substantially parallel to the ninth side 116.

The thirteenth side 124 extends from a distal end of the twelfth side 122. The thirteenth side 124 is disposed substantially perpendicular to the twelfth side 122. The thirteenth side 124 is disposed substantially parallel to the eleventh side 120. The thirteenth side 124 is disposed closer to the second side 102 than the eleventh side 120. The thirteenth side 124 and the twelfth side 122 define a fifth detent 154. The fifth detent 154 may correspond to the reverse position R.

The fourteenth side 126 extends between a distal end of the thirteenth side 124 and the distal end of the fourth side 106. The fourteenth side 126 is disposed substantially parallel to but no coplanar with the twelfth side 122, the tenth side 118, the ninth side 116, the eighth side 114, and the third side 104.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
    a shaft extending along a first axis, the shaft being rotatable about the first axis between a plurality of positions;
    a shift lever pivotally connected to the shaft and movable between a first position that inhibits rotation of the shaft about the first axis and a second position that facilitates rotation of the shaft about the first axis;
    a shift bracket extending between the shaft and an actuator; and
    a shift gate assembly disposed on the shift bracket, the shift gate assembly including a detent plate having a shift gate pattern that includes a first side disposed in a non-parallel and a non-perpendicular relationship with the first axis, a second side spaced apart from the first side, a third side extending between a distal end of the first side and a distal end of the second side, a fourth side spaced apart from the second side, the fourth side disposed parallel to the second side, a fifth side extending between a proximal end of the second side and a proximal end of the fourth side,
    the second side, fourth side, and the fifth side define a first detent.

2. The steering column assembly of claim 1, wherein the shift gate pattern further includes:
    a sixth side disposed opposite the first side, a seventh side spaced apart from the sixth side, an eighth side extending between a distal end of the sixth side and a distal end of the seventh side, and a ninth side extending from a proximal end of the seventh side towards the fourth side, the distal end of the seventh side being disposed closer to the sixth side than the proximal end of the seventh side.

3. The steering column assembly of claim 2, wherein the seventh side is disposed in a nonparallel relationship with the second side.

4. The steering column assembly of claim 2, wherein the seventh side and ninth side at least partially define a second detent.

5. The steering column assembly of claim 4, wherein the shaft defines an opening that at least partially receives a portion of the shift lever.

6. The steering column assembly of claim 5, further comprising a biasing member configured to bias the shift lever towards the first position.

7. The steering column assembly of claim 6, wherein while the shift lever is in the first position, the shift lever is at least partially received within at least one of the first detent and the second detent.

8. A steering column assembly, comprising:
    a shift gate assembly disposed on a shift bracket disposed on a steering column, the shift gate assembly including a detent plate having:
    a first side spaced apart from a second side, a third side extending between the first side and the second side, a fourth side spaced apart from the second side, a fifth side extending between the second side and the fourth side, a sixth side disposed opposite the first side, a seventh side spaced apart from the sixth side, an eighth side extending between the sixth side and the seventh side, and a ninth side extending from the seventh side towards the fourth side, the seventh side becoming progressively closer to the sixth side in a direction that extends towards the eighth side and the seventh side being disposed parallel to the first side.

9. The steering column assembly of claim 8, wherein the fifth side, the eighth side, and the ninth side are disposed parallel to each other but not coplanar with each other.

10. The steering column assembly of claim 8, wherein the ninth side is disposed closer to the eighth side than the fifth side.

11. The steering column assembly of claim 8, wherein a first length is defined between a distal end of the second side and a distal end of the seventh side.

12. The steering column assembly of claim 11, wherein a second length is defined between a proximal end of the second side and a proximal end of the seventh side.

13. The steering column assembly of claim 12, wherein the first length is greater than the second length.

14. A shift gate assembly for a steering column assembly, comprising:
a detent plate having a shift gate defined by:
a first side, a second side spaced apart from the first side, a third side extending between the first side and the second side, a fourth side spaced apart from the second side, a fifth side extending between the second side and the fourth side, a sixth side disposed opposite the first side, a seventh side spaced apart from the sixth side, and an eighth side extending between the sixth side and the seventh side, the seventh side being disposed in a non-parallel relationship with the sixth side and being disposed in a parallel relationship with the first side.

15. The shift gate assembly of claim 14, wherein the seventh side is chamfered.

16. The shift gate assembly of claim 14, wherein the seventh side becomes progressively closer to the sixth side in a direction that extends towards the eighth side.

17. The shift gate assembly of claim 14, wherein the detent plate has a ninth side extending from the seventh side towards the fourth side, a tenth side disposed proximate the ninth side and disposed parallel to the ninth side, and an interrupt surface disposed between the ninth side and the tenth side.

* * * * *